United States Patent Office 3,555,596
Patented Jan. 19, 1971

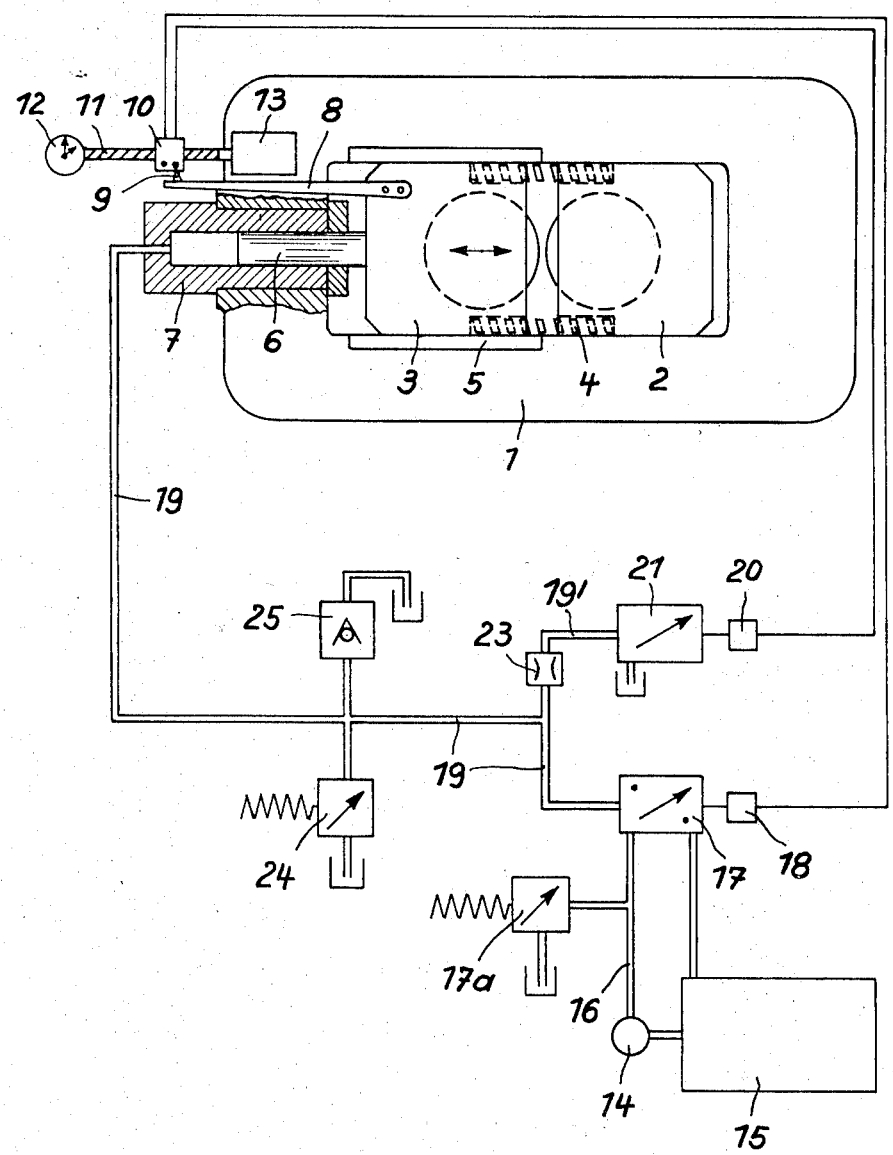

3,555,596
ROLL ADJUSTMENT SYSTEM FOR
PLASTICS CALENDERS
Uwe Thieme, Willich, Germany, assignor to Schloemann Aktiengesellschaft, Dusseldorf, Germany, a company of Germany
Filed July 23, 1968, Ser. No. 746,880
Claims priority, application Germany, Aug. 14, 1967, Sch 41,148
Int. Cl. B30b 3/04
U.S. Cl. 18—2
6 Claims

ABSTRACT OF THE DISCLOSURE

Hydraulic means for adjusting the roll gap of calenders, rolling mills and the like for rolling synthetic materials, in which the bearings of the adjustable roll are connected with a control member, which cooperates with a microswitch having two reversing contacts adjustable to different distances from the roll stand, which controls a valve regulating the supply of pressure liquid to the hydraulic adjusting means, and means, preferably adjustable along a spindle, for indicating the position of the microswitch.

---

The invention relates to an adjustable system for the rolls in plastics calenders and the like, in which the pressure required to absorb the bearing forces is obtained hydraulically.

A conventional device of this type is provided with a combined mechanical and hydraulic system in which a mechanically powered pressure-transmitting means produces the high pressure of between 500 and 600 atmospheres, which is required to absorb the bearing forces. If this pressure is exceeded, a safety valve opens and allows the hydraulic liquid to escape and allows the gaps between the rolls to open until the load is again reduced to normal. However, this arrangement has the disadvantage that the position of the piston in the pressure-transmitting means is not a reliable indication of the actual width of the gap, since inevitable losses of fluid occur through leakage when the safety valve responds, and the volume of oil between the seals is not constant and at the same time the oil is compressible. In order to provide some indication of the size of the gap between the rolls, a vernier system has been provided on the movable roll bearing to cooperate with a scale provided on the stand and permit readings accurate to about 2/10 mm. However, vernier indications have proved to be too inaccurate for products such as plastics film, which require high dimensional accuracy, and in addition such indications are often difficult to read.

It is also not possible to increase the accuracy with which the gap between rolls is indicated by a purely mechanical system, since the adjustment spindles have too great a pitch, and, in addition are subject to elastic deformations which cannot be taken into account by the indicating system. This disadvantage exists even in the case of minimum pitch values.

Moreover, in the case of mechanically or electrically powered roll-adjustment mechanisms, the gear reduction which is made inevitable by the high pressures involved has the disadvantage that roll adjustment requires a considerable amount of time, and at the same time, in the event of accidents occurring or of hard foreign bodies penetrating between the rolls, the delayed opening of the gap leads to grave consequences or damage. While suitably dimensioned plates have been fitted as safety elements, fatigue can cause these plates to break before the maximum load value is reached. Such plates therefore often have to be replaced and to do this it is necessary to bring the whole mill to a standstill.

The object of the invention is to obviate the disadvantages of existing systems as described above, and, in particular, to produce a roll adjustment mechanism which makes possible a sensitive adjustment of the gap between the rolls, and accurate indication of the size of the said gap, and which effects an immediate response in the event of accidents or faulty operation, in the sense of enabling the gap between the rolls to widen rapidly. This is achieved according to the invention substantially in that the bearing of the adjustable roll is connected to a control member which cooperates with a microswitch located at varying distances from the roll stand and is provided with two reversing contacts. This switch acts on a control valve which controls the flow of fluid to and from a roll-adjustment cylinder, and which is followed by a source of pressurised fluid, an indicator being provided to show the position of the bearing member in relation to the roll stand at any given time. Thus in this device the means used for indicating the size of the gap between the rolls and those for adjusting the said gap are completely separate from the means used for effecting direct adjustment, so as to avoid interaction. In addition, the use of a microswitch makes it possible for the position of the rolls to be adjusted or corrected to the predetermined value with a minimum of delay, while variations in the gap, such as may occur as a result of hydraulic leakage, are corrected automatically.

Advantageously the microswitch is located adjustably on a spindle, while the control member is provided with a switching cam and consists of an arm which extends in the direction of movement of the movable roll bearing. The microswitch is advantageously provided with a fine thread, the adjustment spindle being combinable with a twin indicator dial, one needle of which provides a direct indication of the position of the spindle, while the other shows, with reduction, the number of revolutions of the spindle. By this system there is no difficulty in obtaining readings with an accuracy of 1/100 mm.

The invention will now be described with reference to the accompanying drawing, which illustrates the invention, but in no restrictive sense.

The drawing shows the position of the roll bearing and the regulating system. The roll stand 1 contains a fixed roll bearing 2 and a movable roll bearing 3. The movable bearing 3 is guided on rails or in grooves 5 so as to avoid the possibility of tilting. The movable bearing is acted upon by springs 4, which abut against the fixed bearing 2. A piston 6 is secured to the movable bearing 3 and slides in a cylinder 7 mounted in the stand 1. The movable bearing is also provided with an arm 8 combined with a cam 9 and cooperating with the microswitch 10. The latter is able to be adjusted on the spindle 11 by means of a fine screw thread and a twin indicator dial 12, which indicates the exact position of the microswitch 10 relatively to the roll stand 1, and thus also the position of the bearing, which determines the gap between the rolls. Adjustment of the microswitch 10 to a predetermined theoretical value may be effected either by hand or by using the auxiliary motor 13. A hydraulic pump 14 is proivded to ensure a supply of pressurised fluid to the cylinder 7, the pump being connected to a sump 15. A pressure line 16 leading from the pump 14 is provided with an excessive-pressure valve 17a, which, when predetermined pressure is exceeded, causes fluid to be returned to the sump. The line 16 leads into the valve 17, which may be held in one of two positions by means of the microswitch 10 acting through an exciter coil 18. In the "on" position it connects the pressure line 16 to the line 19. The fluid flows into the cylinder 7 so that the piston 6 is urged against the force of the compression springs 4 and the gap and thus reduces the gap. In "off" position the fluid which passes through the line 16 flows without pressure back into the sump.

In addition the microswitch 10 acts through its other contact on the exciter coil 20 for the valve 21, through which the branch 19' of line 19 is held closed or connected to the sump. The valve 21 can only be actuated when the valve 17 is in "off" position, so as to allow fluid to pass from the adjustment cylinder through branch 19' of the line and back into the sump. This occurs as a result of the force exerted by the compression springs 4 on the movable bearing 3 and thus on the piston 6, which causes the gap between the rolls to widen. This solenoid valve 21 may be provided with a cut out delay system. Then when the valve opens, the gap will become slightly too wide and will be adjusted to its theoretical value through the valve 17. In this manner the switching cycle of the microswitch 10 is eliminated and adjustment to the theoretical value of the gap is always effected against the hydraulic pressures.

The pressure line 19' also contains a throttle valve 23. As the gap widens, the pressurised fluid has to pass through the valve 23, which is preferably adjustable. Thus during opening it is possible to keep the adustment speed of the movable bearing below that of the microswitch. Such an arrangement prevents oscillations in the regulating circuit.

In order to ensure that the gap is widened immediately in emergencies, the pressure line 19 is also provided with a controlled nonreturn valve 25 of large diameter, which opens immediately in an emergency and thus reduces pressure rapidly, so that the gap between the rolls is adjusted to maximum width. Advantageously, the opening of the rapid relief valve 25 is combined with the roll drive system so that actuation of the valve causes the rolls to come to a standstill.

The pressure line 19 also contains a pressure limiting valve 24, which opens when the load on the bearing exceeds a certain value, allowing pressurized fluid to flow back into the sump. This ensures that the penetration of foreign bodies between the rolls will not disturb operations.

The pressure-limiting valve 24 and the nonreturn valve 25 may also be combined. In addition, the valves 17 and 21 may be combined as a single valve, using, for example, a three-way valve.

The diagram shown in the drawing illustrates the arrangement for one side—i.e., for one stand of a calender or rolling mill. A similar system must be provided in the second stand, located opposite to it. The adjustment motors which act on the microswitch 10, such as the drive motors 13 in the right-hand and left-hand stands, are advantageously electrically or mechanically coupled, in order always to ensure a constant roll adjustment at each side. The supply of pressurised fluid is obtained either separately for each circuit from two separate pumps, or, in the event of one pump serving both circuits, the valves 17 provided in each circuit must be so designed as to make it possible for each circuit to be supplied with fluid individually.

I claim:

1. Hydraulic means for adjusting the roll gap between the rolls of calenders, rolling mills and like devices for rolling synthetic materials, comprising: stationary bearings for both ends of one roll of the rolling device, bearings adjustable towards and away from the said stationary bearings for both ends of the other roll, a control arm secured to each of the adjustable bearings and extending in the direction of adjustment, a microswitch cooperating with each of the said control arms, two reversing contacts provided on each microswitch, a trip cam adapted to cooperate with the reversing contacts of the microswitch, a device for indicating the position of the microswitch in relation to the roll stand, hydraulic piston-and-cylinder units for displacing the adjustable bearings, control valves controlling the admission of pressure liquid to the piston-and-cylinder units, a source of pressure liquid for the control valves, and piping connecting the said source with the said control valves.

2. Means for adjusting the roll gap as claimed in claim 1, further comprising: a screw-threaded spindle, and motor means for rotating the spindle, the microswitch being adapted to travel along the spindle as a result of such rotation.

3. Means for adjusting the roll gap as claimed in claim 1, further comprising a pressure-limiting valve interposed in the piping connecting the source of pressure liquid with the piston-and-cylinder unit.

4. Means for adjusting the roll gap as claimed in claim 1, further comprising a quick-relief valve interposed in the piping connecting the source of pressure liquid with the piston-and-cylinder unit.

5. Means for adjusting the roll gap as claimed in claim 1, further comprising a valve regulating the speed of recoil, interposed in the piping connecting the source of pressure liquid with the piston-and-cylinder unit.

6. Means for adjusting the roll gap as claimed in claim 1, further comprising a throttle valve interposed in the piping connecting the source of pressure liquid with the piston-and-cylinder unit, for reducing the speed of opening of the roll gap below the speed of adjustment of the microswitch, to preclude hunting.

References Cited

UNITED STATES PATENTS

| | | | |
|---|---|---|---|
| 1,672,118 | 6/1928 | Fraser | 18—2 |
| 1,743,302 | 1/1930 | Allen. | |
| 2,027,283 | 1/1936 | McFadden. | |
| 2,182,900 | 12/1939 | McIlvried et al. | 18—2 |
| 2,424,856 | 7/1947 | Schranck | 18—2 |
| 2,545,921 | 3/1951 | Goodwillie et al. | 18—2CX |
| 2,775,257 | 12/1956 | Stern et al. | 18—21X |
| 2,776,510 | 1/1957 | Klopenstein | 18—100/168X |
| 3,186,200 | 7/1965 | Maxwell | 18—2X |
| 3,292,208 | 12/1966 | Wood | 18—2 |
| 3,328,843 | 7/1967 | Murphy et al. | 18—2 |
| 3,395,200 | 7/1968 | Mader et al. | |
| 3,438,088 | 4/1969 | Westbrook | 18—21X |

FRANK T. YOST, Primary Examiner

U.S. Cl. X.R.

100—170